(12) United States Patent
Doucette

(10) Patent No.: US 6,671,999 B1
(45) Date of Patent: Jan. 6, 2004

(54) INSECT AND RODENT BAIT DISPENSER

(76) Inventor: Carl Doucette, 515 Eucalyptus Dr., El Segundo, CA (US) 90245

( * ) Notice: Subject to any disclaimer, the term of this patent is extended or adjusted under 35 U.S.C. 154(b) by 0 days.

(21) Appl. No.: 10/162,002

(22) Filed: May 30, 2002

(51) Int. Cl.[7] .............................................. A01M 19/00
(52) U.S. Cl. ........................................................ 43/131
(58) Field of Search .......................................... 43/131

(56) References Cited

U.S. PATENT DOCUMENTS

| | | | | |
|---|---|---|---|---|
| 4,453,337 A | * | 6/1984 | Williams | 43/131 |
| 4,550,525 A | * | 11/1985 | Baker et al. | 43/131 |
| 4,637,162 A | * | 1/1987 | Sherman | 43/131 |
| 4,658,536 A | | 4/1987 | Baker | 43/131 |
| 5,272,832 A | * | 12/1993 | Marshall et al. | 43/131 |
| 5,448,852 A | * | 9/1995 | Spragins et al. | 43/131 |
| 5,628,143 A | * | 5/1997 | Doucette | 43/124 |
| 5,657,575 A | * | 8/1997 | Miller et al. | 43/131 |
| 5,857,286 A | * | 1/1999 | Doucette | 43/131 |
| 5,966,863 A | | 10/1999 | Payton et al. | 43/131 |
| 6,082,042 A | * | 7/2000 | Issitt | 43/131 |
| 6,151,828 A | | 11/2000 | Genero et al. | 43/131 |
| 6,266,917 B1 | | 7/2001 | Hight | 43/58 |
| 6,397,517 B1 | * | 6/2002 | Leyerle et al. | 43/131 |
| 6,493,988 B1 | * | 12/2002 | Johnson | 43/131 |
| 6,513,283 B1 | * | 2/2003 | Crossen | 43/131 |

* cited by examiner

*Primary Examiner*—Kurt Rowan
*Assistant Examiner*—Bethany L Griles
(74) *Attorney, Agent, or Firm*—David A. Belasco; Belasco Jacobs & Townsley, LLP

(57) ABSTRACT

An insect and rodent bait dispenser providing flexible means for dispensing a variety of different types of bait is described. The dispenser includes a weatherproof, childproof, enclosure having a pair of shallow reservoirs. Each reservoir includes a vertical element having a central orifice. The orifice is used to support a vertical rod upon which solid bait blocks are stacked. The vertical rod will also support a series of bait trays that may contain liquid or granular bait. The bait trays may be interspersed with the solid bait blocks. The bait trays include planar surfaces and spacing members designed to provide a space between stacked bait trays. The reservoir also accommodates a bottle for dispensing liquid bait into the reservoir. The bottle employs a special cap designed to keep the reservoir filled as liquid bait is removed. The dispenser includes features for mounting the dispenser to a vertical surface.

5 Claims, 4 Drawing Sheets

INSECT AND RODENT BAIT DISPENSER

FIELD OF INVENTION

The invention pertains to devices for eliminating insect and rodent pests. More particularly, the invention relates to insect and rodent bait dispensers that are adaptable to a variety of bait formulation and that maintains such baits in a secure and tamper-proof environment.

BACKGROUND OF THE INVENTION

Various techniques have been developed for eliminating insect and rodent pests. As the most efficient of these devices employ deadly poisons, it is of paramount importance that the poisons be protected from tampering by children and other unauthorized individuals. Further, as a single bait dispenser may be required to handle a wide variety of different insects and rodents, it is important that the dispenser be readily adaptable to dispense liquid and solid baits of various types and methods of preparation, i.e. solids, granules, powders, etc. This dispenser must be able to contain these baits without any danger of leakage to the environment.

U.S. Pat. No. 6,151,828 issued to Genero et aL is directed to an insect feeding station having a plurality of stacked feeding chambers that are progressively exposed as the bait is depleted. The insect feeding station has a housing with a transparent front wall and a rear wall. A large upper entrance chamber is provided and a partition structure that has a plurality of partitions defining feeding chambers. Each partition extends between the front and rear walls and is confined to define a shallow reservoir for containing a portion of toxic liquid. The station is mounted vertically in close proximity to a track that the insects travel.

Toxic liquid is introduced into the upper chamber to fill all of the reservoirs within the interior region.

U.S. Pat. No. 6,266,917 issued to Hight, is directed to a pest control system in the form of a decorative housing that can contain poisoned bait, a trap, or a combination. The pest control article has a housing that includes a decorative unit in the form of a planter mounted on top of a pedestal that contains the pest control devices. The devices can include mousetraps, glue traps, or a poison station with bait for rodents or insects. Unauthorized access to the device is hindered by use of a fastener. The fastener can receive a lock or a chain that can be secured to a building. Also, bolts can be used to secure the bottom to the supporting structure.

U.S. Pat. No. 5,966,863, issued to Payton et al. discloses a combined bait station for ants and rodents. The combined station has an inner container having a lid for containing liquid ant bait. An outer container formed by the walls contains a rodent bait compartment and adjacent passageways. The bait compartment includes a bait rod or rack on which pieces of solid rodent bait are hung. The cover has a hole and the front wall center portion has a hole that can have a stake passed through into the ground to secure the bait unit.

U.S. Pat. No. 4,658,536 issued to Baker discloses a rodent bait station. The bait station has a housing with a base and a cover. An inspection and access cap is provided on the top and a childproof tab is also provided. Ties can be strung through tie anchor slots on either side of the base and cover housing to maintain the station at its desired location. The interior of the bait station has two bait bins.

U.S. Pat. No. 6,082,042 issued to Issitt is directed to a tamper-resistant bait station for rats. The bait station has a lower housing and an upper lid, both molded from polypropylene. The lid includes transparent plates that allow inspection without opening the lid. The bait station has a feeding area with a piece of wire that is threaded through solid bait blocks, with the wire secured to two sets of slots. The bait station may receive several baits in the feeding area or if loose grain poisoned bait is used, the box is secured to the floor so that the bait cannot possibly be shaken out of the box. There are difficult-to-open locks provided between the lid and the housing. A key is provided to facilitate opening the lid.

While other variations exist, the above-described designs for insect and rodent bait dispensers are typical of those encountered in the prior art. It is an objective of the present invention to provide a tamper-proof container for insect and rodent baits. It is a further objective to provide a bait dispenser adaptable for use with a variety of liquid, granular and solid baits for both rodents and insects. It is a still further objective of the invention to provide a bait dispenser that will require the insects or rodents to follow a convoluted path to the bait to prevent unwanted removal of dead insects or rodents. It is yet a further objective to provide the above described capabilities in an inexpensive and durable dispenser that is capable of extended duty cycles and that may be easily repaired and maintained.

While some of the objectives of the present invention are disclosed in the prior art, none of the inventions found include all of the requirements identified.

SUMMARY OF THE INVENTION

The present invention addresses all of the deficiencies of insect and rodent bait dispensing inventions and satisfies all of the objectives described above. An insect and rodent bait dispenser providing the desired features may be constructed from the following components. At least one receptacle is provided. The receptacle has a bottom surface and a wall of a first predetermined height surrounding the bottom surface. A vertical element is provided. The vertical element has an upper end and a lower end and is secured at the lower end to the bottom surface. The vertical element extends upwardly from the bottom surface for a first predetermined distance. The vertical element has a first central orifice. The first orifice extends from the upper end toward the lower end and is sized and shaped to fit frictionally about a vertical shaft.

An enclosure is provided. The enclosure is sized and shaped to surround the receptacle. The enclosure can be opened for replenishment of bait and has a closure means incapable of being opened by small children or animals. The enclosure includes at least one passageway leading from an outer surface of the enclosure to the receptacle. The passageway is sized and shaped to permit entry by rodents or insects while preventing a child or domestic animal from reaching the bait.

In a variant of the invention, the insect and rodent bait dispenser includes a vertical shaft. The vertical shaft has a predetermined cross-section, is removably attached to the vertical element and extends upwardly from the vertical element for a second predetermined distance.

In another variant the insect and rodent bait dispenser includes a plurality of blocks of solid poison bait. Each of the blocks is of lateral dimensions and a configuration to fit within the receptacle. Each block has an axial orifice for the block to be located on and slide down the shaft. When rodents or insects consume the lowermost block on the shaft, the blocks above the consumed block, slide down the shaft to locate the lowermost block in the receptacle as a replacement for the consumed block.

In still another variant, at least one bait tray is provided. The bait tray has an upper surface, a lower surface, a second orifice extending from the upper surface to the lower surface, at least one cavity located in the upper surface and means for maintaining a space between the upper surface and a lower surface of a second bait tray located above the bait tray. The second orifice is sized and shaped to fit slidably about the vertical shaft such that a plurality of the bait trays will stack on the vertical shaft. When different varieties of solid, liquid or granular bait are located within the cavities of the trays, each variety of bait will be simultaneously accessible.

In a further variant of the invention, the means for maintaining a space between adjacent stacked bait trays includes a least one planar surface. The planar surface is located upon the lower surface of the bait tray. At least one spacing member is provided. The spacing member projects upwardly from the upper surface of the bait tray and is located so as to bear upon the planar surface of an adjacent stacked bait tray causing an upper bait tray to be spaced above a lower bait tray for a third predetermined distance. When the adjacent stacked bait trays are so spaced vertically, access to each of the trays will be enhanced.

In still a further variant, a plurality of blocks of solid poison bait is provided. Each of the blocks is of lateral dimensions and a configuration to fit within the receptacle. Each block has an axial orifice for the block to be located on and slide down the shaft. The blocks of solid poison bait are located upon the shaft either above or below the bait trays. When the blocks of solid poison bait are consumed, either the bait trays or the blocks of solid poison bait will slide downwardly on the shaft.

In yet a further variant of the invention, the insect and rodent bait dispenser includes an inverted bottle containing liquid poison bait. The bottle has a neck terminating in a flanged opening. Means are provided to support the bottle in inverted position with its opening directed down into the receptacle. A cap for the bottle is provided. The cap is formed of a stretchable material and includes an outer cylinder and an inner cylinder of lesser diameter than the diameter of the outer cylinder to provide a space between the cylinders.

The cylinders are co-axial, and one end of both cylinders terminates in a unitary transverse member. The transverse member has a central orifice of the same configuration and dimension as the vertical element to enable the vertical element to be passed through the central orifice. At least one secondary orifice is provided. The secondary orifice extends axially through the transverse member in communication with the space between the cylinders and is spaced from the central orifice. Another end of the inner cylinder not terminating in the unitary transverse member terminates in a second transverse member of greater diameter than the diameter of the inner cylinder and, in unstretched condition, abutting the flanged opening of the bottle, thereby to close the opening.

When the capped bottle is pressed downwardly onto the vertical element, the inner cylinder is stretched to lift the second transverse member from the flanged opening of the bottle, thereby permitting the fluid bait to pass between the inner and outer cylinders and through the at least one secondary orifice in the unitary transverse member and into the receptacle until the liquid in the receptacle reaches a predetermined level. As the liquid is removed from the receptacle it will be automatically replenished from the inverted bottle so long as liquid remains in the bottle.

In another variant, each receptacle is interchangeably usable for solid, granular or liquid bait by selectively attaching either the vertical shaft with either of solid and tray mounted bait or the inverted liquid bait bottle.

In a final variant of the invention, the insect and rodent bait dispenser includes means for removably attaching the enclosure to a surface.

An appreciation of the other aims and objectives of the present invention and an understanding of it may be achieved by referring to the accompanying drawings and the detailed description of a preferred embodiment.

DETAILED DESCRIPTION OF THE PREFERRED EMBODIMENT

Figure 1:
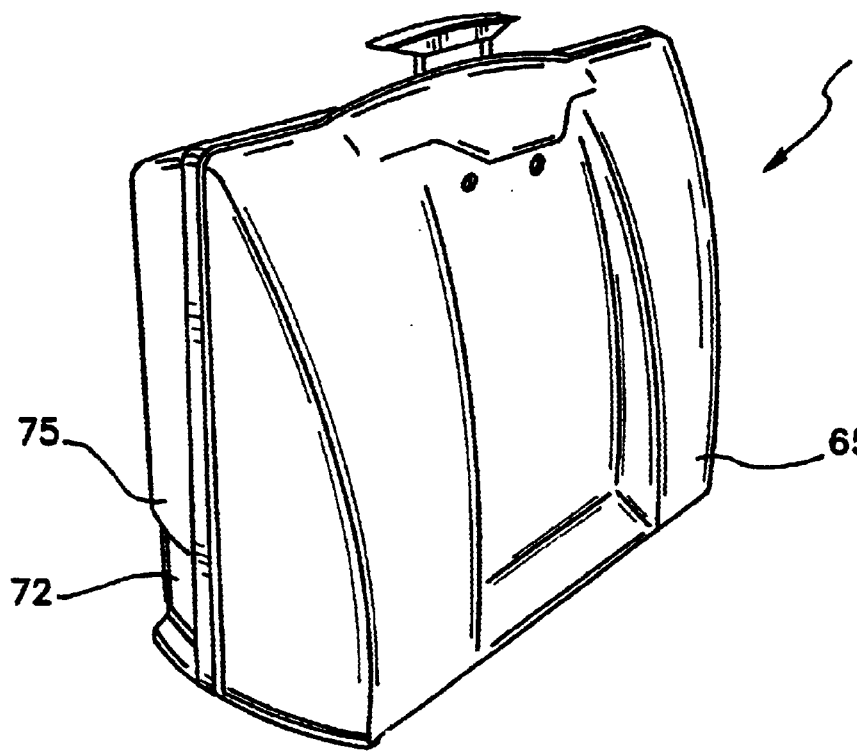
FIG. 1 is a perspective view of the preferred embodiment of the invention illustrating the enclosure in a closed position.
Figure 2:
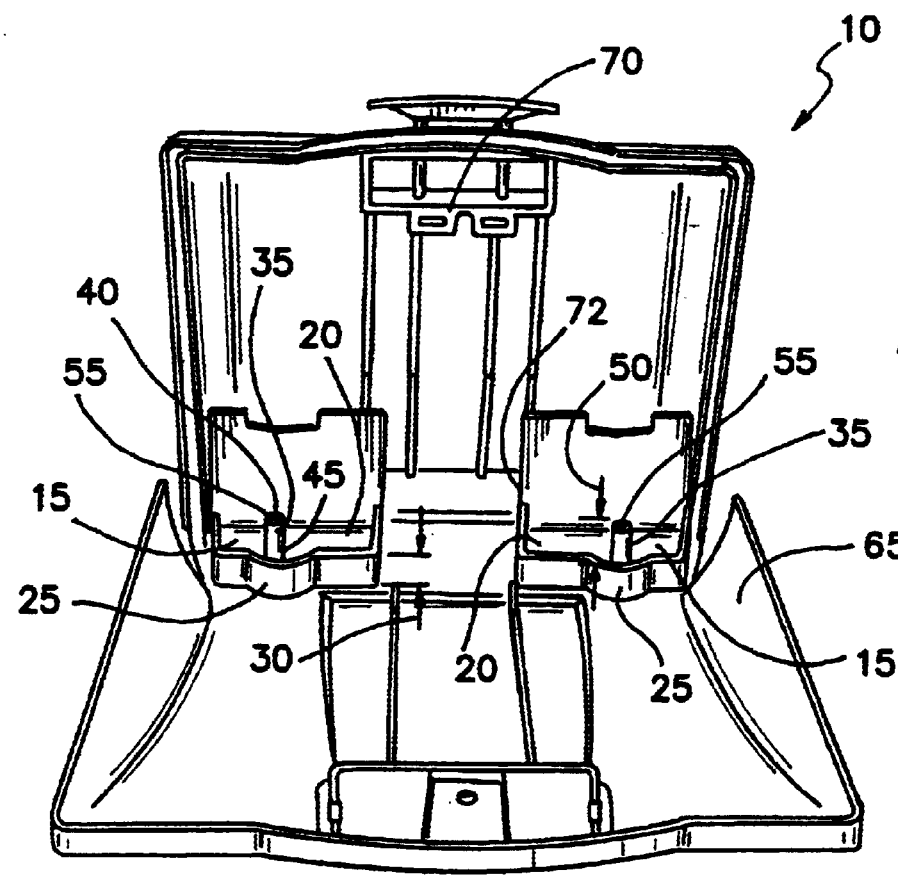
FIG. 2 is a perspective view of the FIG. 1 embodiment illustrating the enclosure in an open position.
Figure 3:
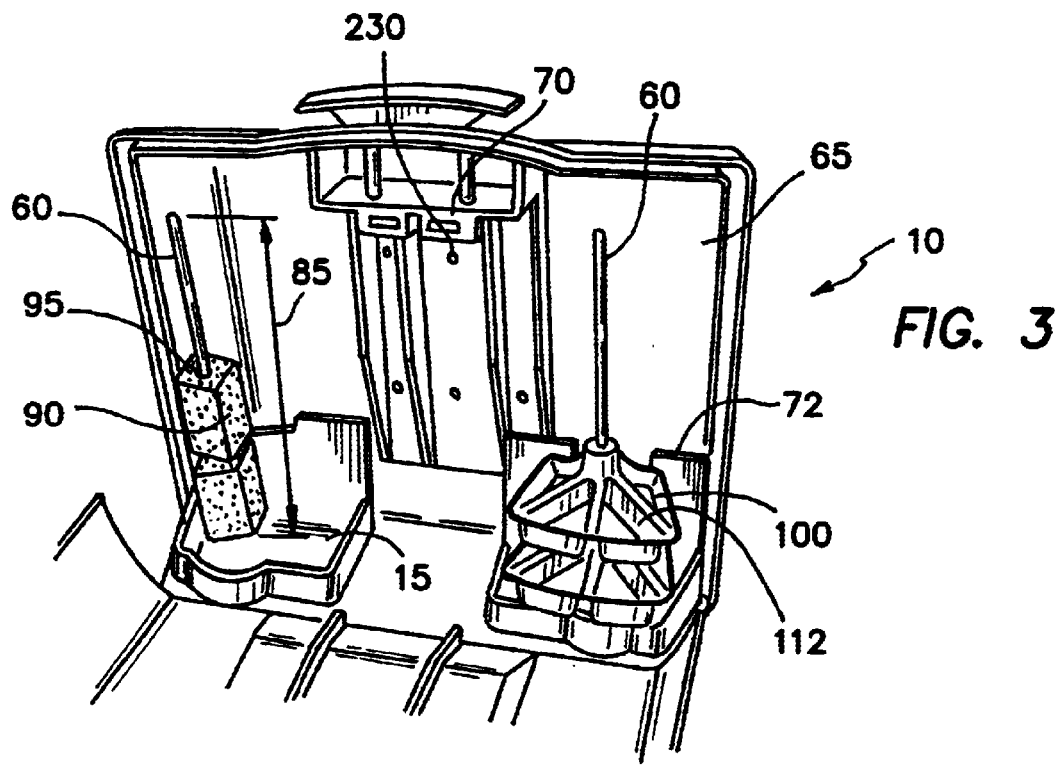
FIG. 3 is a perspective view of the FIG. 1 embodiment illustrating two vertical rods attached to the receptacles, a first receptacle having a solid bait attached and a second receptacle having a pair of bait trays attached.
Figure 4:
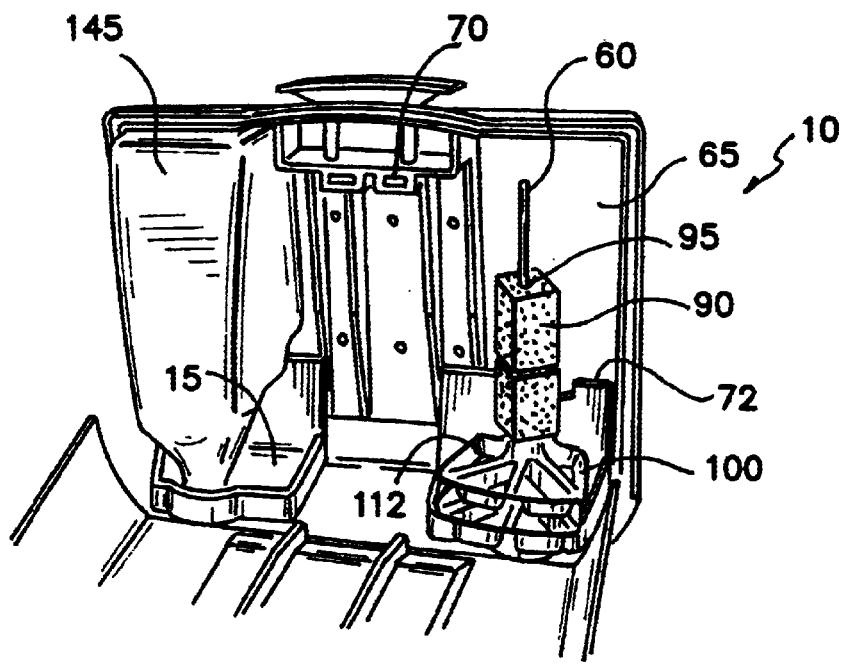
FIG. 4 is a perspective view of the FIG. 1 embodiment illustrating a liquid bait dispenser attached to the first receptacle and solid bait and bait trays attached to the second receptacle.
Figure 5:
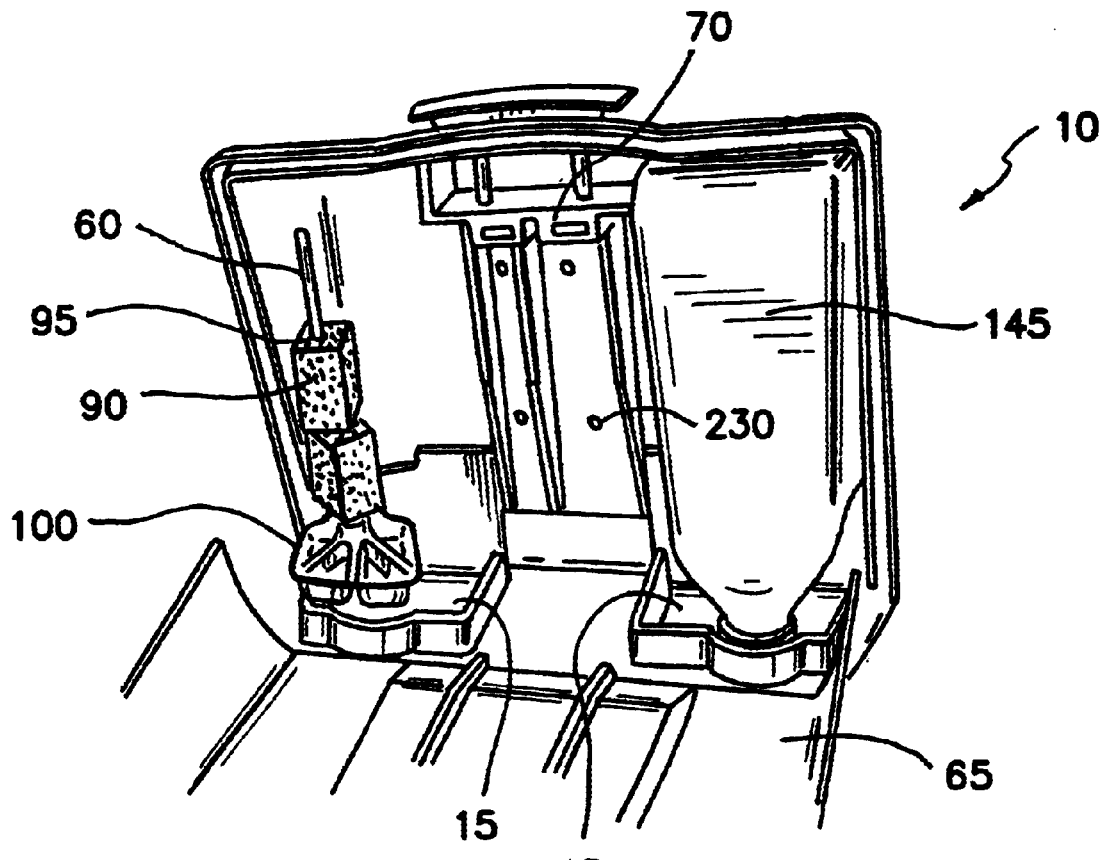
FIG. 5 is a perspective view of the FIG. 1 embodiment illustrating a liquid bait dispenser attached to the second receptacle and solid bait and bait trays attached to the first receptacle.

FIGS. 1–5 illustrate an insect and rodent bait dispenser 10 providing the desired features that may be constructed from the following components. As illustrated in FIG. 2, at least one receptacle 15 is provided. The receptacle 15 has a bottom surface 20 and a wall 25 of a first predetermined height 30 surrounding the bottom surface 20. A vertical element 35 is provided. The vertical element 35 has an upper end 40 and a lower end 45 and is secured at the lower end 45 to the bottom surface 20. The vertical element 35 extends upwardly from the bottom surface 20 for a first predetermined distance 50. The vertical element 35 has a first central orifice 55. The first orifice 55 extends from the upper end 40 toward the lower end 45 and is sized and shaped to fit frictionally about a vertical shaft 60, as seen in FIGS. 3–5.

As illustrated in FIGS. 1–5, an enclosure is provided 65. The enclosure 65 is sized and shaped to surround the receptacle 15. The enclosure 65 can be opened for replenishment of bait and has a closure means 70 incapable of being opened by small children or animals. The enclosure 65 includes at least one passageway 72 leading from an outer surface 75 of the enclosure 65 to the receptacle 15. The passageway 72 is sized and shaped to permit entry by rodents or insects while preventing a child or domestic animal from reaching the bait.

In a variant of the invention, as illustrated in FIGS. 3–5 and 7, the insect and rodent bait dispenser 10 includes a vertical shaft 60. The vertical shaft 60 has a predetermined cross section 80, is removably attached to the vertical element 35 and extends upwardly from the vertical element 35 for a second predetermined distance 85.

In another variant, as illustrated in FIGS. 3–5, the insect and rodent bait dispenser 10 includes a plurality of blocks of solid poison bait 90. Each of the blocks 90 is of lateral dimensions and a configuration to fit within the receptacle 15. Each block 90 has an axial orifice 95 for the block 90 to be located on and slide down the shaft 60. When rodents or insects consume the lowermost block 90 on the shaft 60, the blocks 90 above the consumed block 90, slide down the shaft 60 to locate the lowermost block 90 in the receptacle 15 as a replacement for the consumed block 90.

In still another variant, as illustrated in FIGS. 3–7, at least one bait tray 100 is provided. The bait tray 100 has an upper surface 105, a lower surface 110, a second orifice 115 extending from the upper surface 105 to the lower surface 110, at least one cavity 112 located in the upper surface 105 and means 120 for maintaining a space 125 between the upper surface 105 and a lower surface 110 of a second bait tray 100 located above the bait tray 100. The second orifice 115 is sized and shaped to fit slidably about the vertical shaft 60 such that a plurality of the bait trays 100 will stack on the vertical shaft 60. When different varieties of solid, liquid or granular bait are located within the cavities 112 of the trays 100, each variety of bait will be simultaneously accessible.

Figure 6:
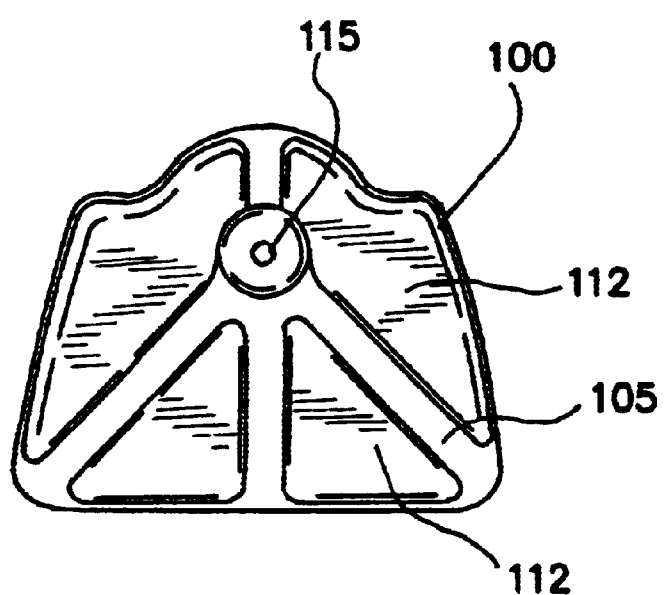
FIG. 6 is a top plan view of the bait tray.
Figure 7:
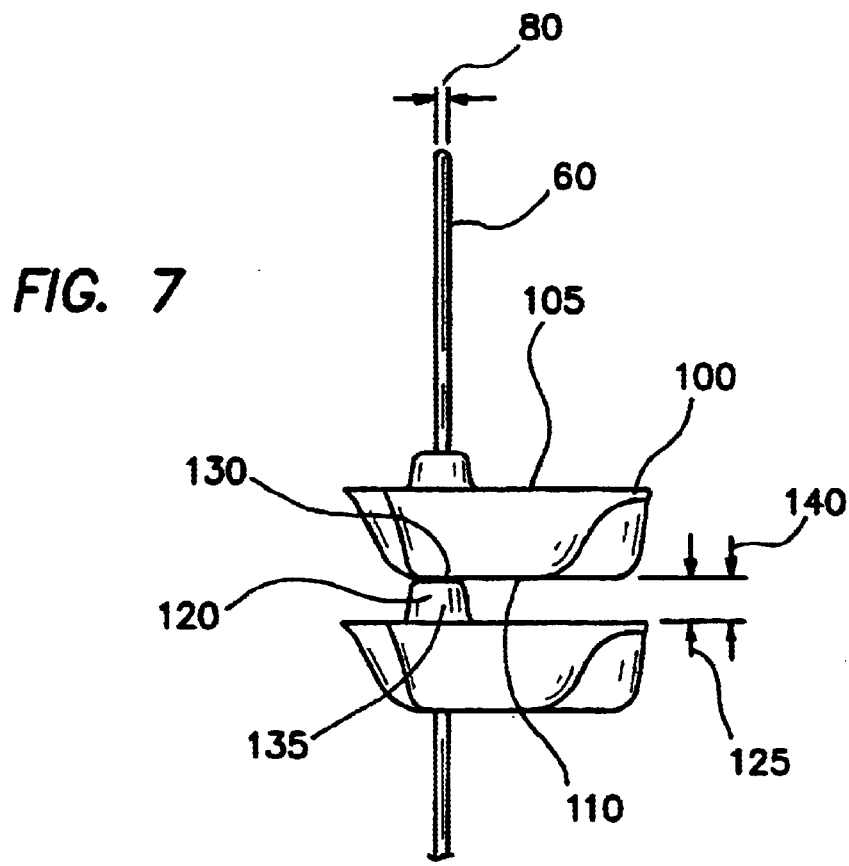
FIG. 7 is a side view of the bait trays disposed on the vertical rod, illustrating the stacking features of the trays.

In a further variant of the invention, as illustrated in FIGS. 6 and 7, the means 120 for maintaining a space 125 between adjacent stacked bait trays 100 includes a least one planar surface 130. The planar surface 130 is located upon the lower surface 110 of the bait tray 100. At least one spacing member 135 is provided. The spacing member 135 projects upwardly from the upper surface 105 of the bait tray 100 and is located so as to bear upon the planar surface 130 of an adjacent stacked bait tray 100 causing an upper bait tray 100 to be spaced above a lower bait tray 100 for a third predetermined distance 140. When the adjacent stacked bait trays 100 are so spaced vertically, access to each of the trays 100 will be enhanced.

In still a further variant, as illustrated in FIGS. 4 and 5, a plurality of blocks of solid poison bait 90 is provided. Each of the blocks 90 is of lateral dimensions and a configuration to fit within the receptacle 15. Each block 90 has an axial orifice 95 for the block 90 to be located on and slide down the shaft 60. The blocks of solid poison bait 90 are located upon the shaft 60 either above or below the bait trays 100. When the blocks of solid poison bait 90 are consumed, either the bait trays 100 or the blocks of solid poison bait 90 will slide downwardly on the shaft 60.

Figure 8:
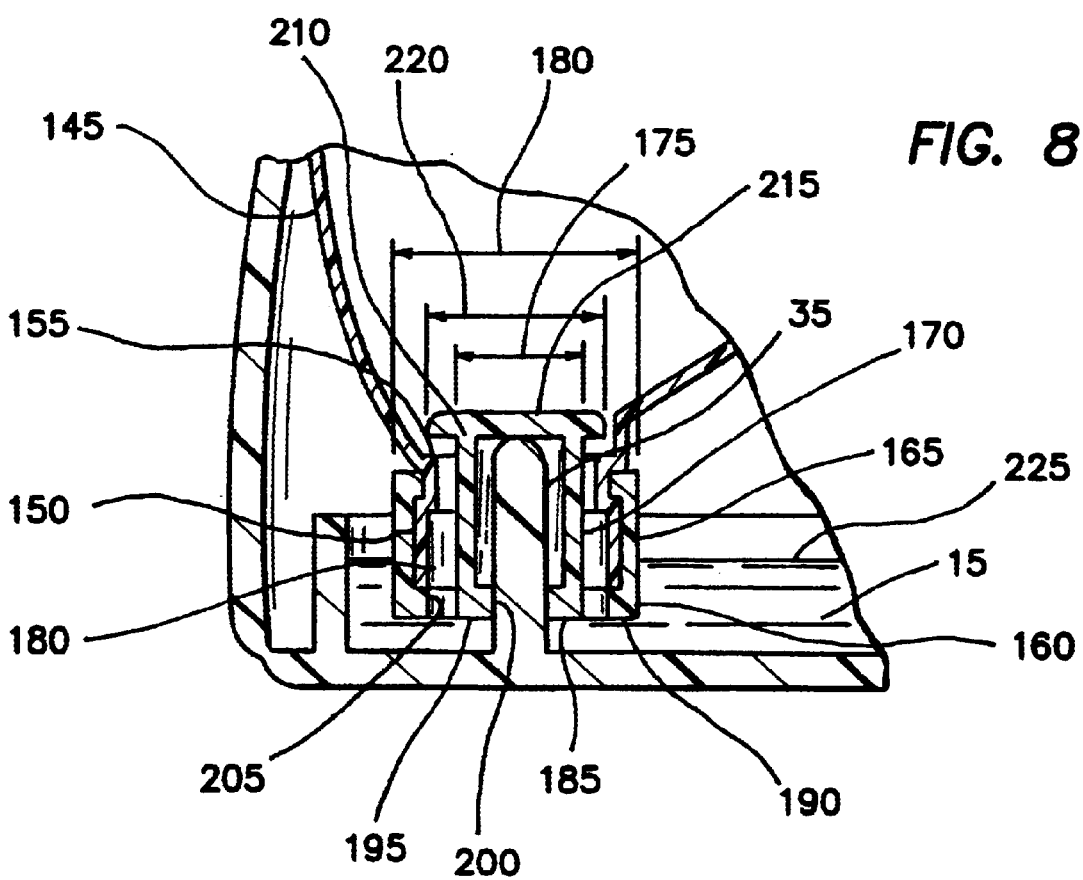
FIG. 8 is a detailed, cross-sectional view of a liquid bait poison bottle and one of the receptacles.

In yet a further variant of the invention, as illustrated in FIGS. 4, 5 and 8, the insect and rodent bait dispenser 10 includes an inverted bottle containing liquid poison bait 145. The bottle 145 has a neck 150 terminating in a flanged opening 155. Means (not shown) are provided to support the bottle 145 in inverted position with its opening 155 directed down into the receptacle 15. A cap 160 for the bottle 145 is provided. The cap 160 is formed of a stretchable material and includes an outer cylinder 165 and an inner cylinder 170 of lesser diameter 175 than the diameter 180 of the outer cylinder 165 to provide a space 180 between the cylinders 165, 170.

The cylinders 165, 170 are co-axial, and one end 185, 190 of both cylinders 165, 170 terminates in a unitary transverse member 195. The transverse member 195 has a central orifice 200 of the same configuration and dimension as the vertical element 35 to enable the vertical element 35 to be passed through the central orifice 200. At least one secondary orifice 205 is provided. The secondary orifice 205 extends axially through the transverse member 195 in communication with the space 180 between the cylinders 165, 170 and is spaced from the central orifice 200. Another end 210 of the inner cylinder 170 not terminating in the unitary transverse member 195 terminates in a second transverse member 215 of greater diameter 220 than the diameter 175 of the inner cylinder 170 and, in unstretched condition, abutting the flanged opening 155 of the bottle 145, thereby to close the opening 155.

When the capped bottle 145 is pressed downwardly onto the vertical element 35, the inner cylinder 170 is stretched to lift the second transverse member 215 from the flanged bottle opening 155, thereby permitting the fluid bait to pass between the inner 170 and outer 165 cylinders and through the at least one secondary orifice 205 in the unitary transverse member 195 and into the receptacle 15 until the liquid 220 in the receptacle 15 reaches a predetermined level 225. As the liquid 220 is removed from the receptacle 15 it will be automatically replenished from the inverted bottle 145 so long as liquid 220 remains in the bottle 145.

In another variant, as illustrated in FIGS. 4 and 5, each receptacle 15 is interchangeably usable for solid, granular or liquid bait by selectively attaching either the vertical shaft 60 with either of solid 90 and tray 100 mounted bait or the inverted liquid bait bottle 145.

In a final variant of the invention, as illustrated in FIG. 3–5, the insect and rodent bait dispenser 10 includes means 230 for removably attaching the enclosure 65 to a surface (not shown).

The insect and rodent bait dispenser 10 has been described with reference to particular embodiments. Other modifications and enhancements can be made without departing from the spirit and scope of the claims that follow.

What is claimed is:

1. An insect and rodent bait dispenser comprising:
   at least one receptacle, said receptacle having a bottom surface, a wall of a first predetermined height surrounding said bottom surface;
   a vertical element, said vertical element having an upper end and a lower end and being secured at said lower end to said bottom surface and extending upwardly therefrom for a first predetermined distance;
   said vertical element having a first central orifice, said first orifice extending from said upper end toward said lower end and being sized and shaped to fit frictionally about a vertical shaft;
   an enclosure, said enclosure being sized and shaped to surround said receptacle, openable for replenishment of bait and having a closure means incapable of being opened by small children or animals;
   said enclosure including at least one passageway leading from an outer surface of the enclosure to said receptacle, said passageway being sized and shaped to permit entry by rodents or insects while preventing a child or domestic animal from reaching the bait;
   a vertical shaft, said vertical shaft having a predetermined cross-section, being removably attached to said vertical element and extending upwardly therefrom for a second predetermined distance;
   at least one bait tray, said bait tray having an upper surface, a lower surface, a second orifice extending from said upper surface to said lower surface, at least one cavity disposed in said upper surface and means for maintaining a space between said upper surface and a lower surface of a second bait tray disposed above said bait tray;

said second orifice being sized and shaped to fit slidably about said vertical shaft such that a plurality of said bait trays will stack on said vertical shaft; and whereby, when different varieties of either of solid and liquid and granular bait are disposed within the cavities of said trays, each variety of bait will be simultaneously accessible.

2. An insect and rodent bait dispenser as described in claim 1, wherein the means for maintaining a space between adjacent stacked bait trays further comprises:

a least one planar surface, said planar surface being disposed upon the lower surface of said bait tray;

at least one spacing member, said spacing member projecting upwardly from the upper surface of said bait tray and being disposed so as to bear upon said planar surface of an adjacent stacked bait tray causing an upper bait tray to be spaced above a lower bait tray for a third predetermined distance; and whereby, when said adjacent stacked bait trays are so spaced vertically, access to each of the trays will be enhanced.

3. An insect and rodent bait dispenser as described in either of claim 1 and claim 2, further comprising:

a plurality of blocks of solid poison bait, each of said blocks being of lateral dimensions and a configuration to fit within the receptacle, and each block having an axial orifice for said block to be disposable on and slide down the shaft;

said blocks of solid poison bait being disposed upon the shaft either of above and below said bait trays; and whereby, when said blocks of solid poison bait are consumed, either of said bait trays and said blocks of solid poison bait will slide downwardly on said shaft.

4. An insect and rodent bait dispenser as described in claim 1, further comprising:

an inverted bottle containing liquid poison bait, said bottle having a neck terminating in a flanged opening;

means to support said bottle in inverted position with its opening directed down into the receptacle; and a cap for the bottle, said cap formed of a stretchable material and comprising an outer cylinder and an inner cylinder of lesser diameter than the diameter of the outer cylinder to provide a space between the cylinders;

said cylinders being co-axial, and one end of both cylinders terminating in a unitary transverse member, said transverse member having a central orifice of the same configuration and dimension as said vertical element to enable said vertical element to be passed through said central orifice;

at least one secondary orifice extending axially through the transverse member in communication with said space between the cylinders and spaced from said central orifice;

the other end of the inner cylinder not terminating in the unitary transverse member, terminating in a second transverse member of greater diameter than the diameter of the inner cylinder and, in unstretched condition, abutting the flanged opening of the bottle, thereby to close said opening;

whereby, when the capped bottle is pressed downwardly onto the vertical element, the inner cylinder is stretched to lift the second transverse member from the flanged opening of the bottle, thereby permitting the fluid bait to pass between the inner and outer cylinders and through the at least one secondary orifice in the unitary transverse member and into the receptacle until the liquid in the receptacle reaches a predetermined level as the liquid is removed from the receptacle it will be automatically replenished from the inverted bottle so long as liquid remains in the bottle.

5. An insect and rodent bait dispenser as described in claim 3, wherein each at least one receptacle is interchangeably usable for either of solid, granular and liquid bait by selectively attaching either of the vertical shaft with either of solid and tray mounted bait and the inverted liquid bait bottle.

* * * * *